United States Patent
Yamada et al.

(10) Patent No.: US 10,088,025 B2
(45) Date of Patent: Oct. 2, 2018

(54) AUTOMATIC TRANSMISSION FOR ELECTRIC VEHICLE

(71) Applicant: JATCO Ltd, Fuji-shi, Shizuoka (JP)

(72) Inventors: Atsushi Yamada, Fuji (JP); Toshiaki Segawa, Shizuoka (JP); Toshiyuki Okamoto, Fuji (JP); Kazuhiko Yokoyama, Fuji (JP); Kazuo Oguri, Ito (JP); Takuya Yamazaki, Amagasaki (JP)

(73) Assignee: JATCO Ltd, Fuji-Shi (JP)

( * ) Notice: Subject to any disclaimer, the term of this patent is extended or adjusted under 35 U.S.C. 154(b) by 235 days.

(21) Appl. No.: 14/917,119

(22) PCT Filed: Sep. 4, 2014

(86) PCT No.: PCT/JP2014/073280
§ 371 (c)(1),
(2) Date: Mar. 7, 2016

(87) PCT Pub. No.: WO2015/045771
PCT Pub. Date: Apr. 2, 2015

(65) Prior Publication Data
US 2016/0208896 A1    Jul. 21, 2016

(30) Foreign Application Priority Data

Sep. 24, 2013 (JP) ................. 2013-197496

(51) Int. Cl.
*F16H 37/02* (2006.01)
*F16H 61/662* (2006.01)
*F16H 63/06* (2006.01)

(52) U.S. Cl.
CPC ..... *F16H 37/021* (2013.01); *F16H 61/66272* (2013.01); *F16H 63/062* (2013.01);
(Continued)

(58) Field of Classification Search
CPC ............. F16H 2037/025; F16H 63/062; F16H 37/021; F16H 2037/023
See application file for complete search history.

(56) References Cited

U.S. PATENT DOCUMENTS 2,276,186 A   3/1942  Getchell
2,283,392 A   5/1942  Shadrick
(Continued)

FOREIGN PATENT DOCUMENTS

EP   0004487 A1   10/1979
EP   0 943 839 A2   9/1999
(Continued)

OTHER PUBLICATIONS

U.S. Appl. No. 14/917,126, filed Mar. 7, 2016, JATCO Ltd.
(Continued)

*Primary Examiner* — William J Kelleher
*Assistant Examiner* — Gregory T Prather
(74) *Attorney, Agent, or Firm* — Foley & Lardner LLP

(57) ABSTRACT

An automatic transmission for an electric vehicle includes: a belt type continuously variable transmission mechanism; a constantly meshed parallel shaft type gear transmission mechanism which is connected to an output portion of the belt type continuously variable transmission mechanism, and which has a plurality of shift stages; an input gear which is disposed to the input shaft to be rotated relative to the input shaft, and which is drivingly connected to one of a plurality of shift gears fixed to an output side shaft of the constantly meshed parallel shaft type gear transmission mechanism; and an engaging clutch mechanism which is disposed to the input shaft, and which selectively connects one of the input portion of the belt type continuously variable transmission mechanism and the input gear to the main electric motor.

3 Claims, 4 Drawing Sheets

(52) U.S. Cl.
CPC ...... *F16H 61/662* (2013.01); *F16H 2037/023* (2013.01); *F16H 2037/025* (2013.01); *Y02T 10/7258* (2013.01)

(56) References Cited

U.S. PATENT DOCUMENTS

| | | | |
|---|---|---|---|
| 3,011,353 A * | 12/1961 | Friedrich | F16H 37/00 474/72 |
| 3,195,364 A | 7/1965 | Pauli | |
| 3,224,287 A | 12/1965 | Gesche et al. | |
| 3,279,270 A | 10/1966 | Pacak | |
| 3,365,967 A | 1/1968 | Moogk | |
| 3,616,706 A | 11/1971 | Shimamoto | |
| 3,722,308 A | 3/1973 | Steuer | |
| 4,095,479 A | 6/1978 | Lundberg | |
| 4,294,137 A * | 10/1981 | Piret | F16H 37/021 475/206 |
| 4,378,221 A | 3/1983 | Huff et al. | |
| 4,403,976 A | 9/1983 | Takagi | |
| 4,436,193 A * | 3/1984 | Smirl | F16D 13/64 192/107 C |
| 4,458,558 A * | 7/1984 | Frank | F16H 37/021 474/28 |
| 4,459,872 A * | 7/1984 | Tibbles | F16H 3/14 192/3.57 |
| 4,504,247 A * | 3/1985 | Chana | F16H 63/062 474/17 |
| 4,523,917 A | 6/1985 | Schildt | |
| 4,585,429 A | 4/1986 | Marier | |
| 4,592,737 A | 6/1986 | Dhont | |
| 4,608,885 A * | 9/1986 | Koivunen | F16H 37/021 474/72 |
| 4,660,438 A * | 4/1987 | Tatara | F16H 37/021 477/41 |
| 4,747,327 A * | 5/1988 | Itoh | F16H 37/021 477/162 |
| 4,976,657 A | 12/1990 | Takano | |
| 5,024,638 A * | 6/1991 | Sakakibara | F16D 28/00 192/12 D |
| 5,080,639 A * | 1/1992 | Sakakibara | F16H 37/022 475/211 |
| 5,184,981 A | 2/1993 | Wittke | |
| 5,403,240 A | 4/1995 | Smith et al. | |
| 5,720,686 A * | 2/1998 | Yan | F16H 37/021 475/211 |
| 5,766,105 A | 6/1998 | Fellows et al. | |
| 5,937,711 A * | 8/1999 | McCarrick | B60K 17/342 74/333 |
| 6,336,878 B1 | 1/2002 | Ehrlich et al. | |
| 6,379,274 B1 | 4/2002 | Robert | |
| 6,413,178 B1 | 7/2002 | Chamberland | |
| 6,502,479 B1 | 1/2003 | Lee | |
| 6,755,759 B2 | 6/2004 | Blanchard | |
| 6,758,775 B2 | 7/2004 | Heinrich et al. | |
| 6,860,826 B1 | 3/2005 | Johnson | |
| 6,958,025 B2 | 10/2005 | Huddleston | |
| 7,081,057 B2 | 7/2006 | Kalies | |
| 7,300,370 B2 | 11/2007 | Wood | |
| 7,901,308 B2 | 3/2011 | Binello et al. | |
| 8,272,981 B2 | 9/2012 | Galletti et al. | |
| 8,328,669 B2 | 12/2012 | Nouis | |
| 8,393,985 B2 | 3/2013 | Blanchard | |
| 8,496,551 B2 | 7/2013 | Mueller et al. | |
| 8,894,520 B2 | 11/2014 | Labbe | |
| 9,005,058 B2 | 4/2015 | Ouchida et al. | |
| 9,909,657 B2 * | 3/2018 | Uchino | F16H 37/021 |
| 2002/0065157 A1 | 5/2002 | Heinrich et al. | |
| 2002/0115510 A1 | 8/2002 | Onogi | |
| 2002/0183145 A1 | 12/2002 | Blanchard | |
| 2004/0063524 A1 | 4/2004 | Zulawski | |
| 2004/0089511 A1 | 5/2004 | Bergman | |
| 2004/0092345 A1 | 5/2004 | Borghi | |
| 2004/0102267 A1 * | 5/2004 | Murakami | F16H 7/08 474/69 |
| 2004/0142781 A1 | 7/2004 | Huddleston | |
| 2004/0229724 A1 | 11/2004 | Kalies | |
| 2004/0266570 A1 | 12/2004 | Kalies | |
| 2005/0043128 A1 | 2/2005 | Zulawski | |
| 2005/0096163 A1 | 5/2005 | Gu et al. | |
| 2005/0202912 A1 * | 9/2005 | Tay | F16H 63/062 474/83 |
| 2005/0239585 A1 | 10/2005 | Nishida et al. | |
| 2005/0277502 A1 * | 12/2005 | Wood | F16H 9/20 474/19 |
| 2007/0026981 A1 | 2/2007 | Blanchard | |
| 2007/0117664 A1 * | 5/2007 | Shioiri | F16H 55/56 474/28 |
| 2007/0270267 A1 | 11/2007 | Miller et al. | |
| 2008/0102998 A1 | 5/2008 | Teijido et al. | |
| 2009/0156338 A1 | 6/2009 | Galletti et al. | |
| 2010/0240492 A1 * | 9/2010 | Vyas | B60K 6/365 477/3 |
| 2010/0317473 A1 * | 12/2010 | Simon | F16H 37/021 474/11 |
| 2011/0053720 A1 * | 3/2011 | Kang | F16H 37/021 474/148 |
| 2012/0100944 A1 | 4/2012 | Gu et al. | |
| 2013/0123065 A1 * | 5/2013 | Bujold | F16H 15/503 477/41 |
| 2013/0244819 A1 * | 9/2013 | Eo | F16H 37/021 474/39 |
| 2013/0331226 A1 * | 12/2013 | Eo | F16H 15/14 476/54 |
| 2014/0100078 A1 * | 4/2014 | Tsukamoto | B60W 10/02 477/40 |
| 2015/0011344 A1 | 1/2015 | Ebihara et al. | |
| 2015/0018167 A1 * | 1/2015 | Toyoda | B60W 10/109 476/11 |
| 2015/0133257 A1 * | 5/2015 | Uchino | F16H 37/022 475/210 |
| 2015/0184728 A1 * | 7/2015 | Mordukhovich | F16H 37/021 74/664 |
| 2015/0337931 A1 * | 11/2015 | Walter | F16H 37/022 475/210 |
| 2015/0354676 A1 * | 12/2015 | Versteyhe | F16H 37/021 475/189 |
| 2016/0076625 A1 | 3/2016 | Guiroult | |
| 2016/0102741 A1 * | 4/2016 | Uchino | F16H 37/021 474/8 |
| 2016/0109000 A1 * | 4/2016 | Uchino | F16H 37/022 474/8 |
| 2016/0169354 A1 | 6/2016 | Barendrecht | |
| 2016/0186841 A1 | 6/2016 | Ebihara et al. | |
| 2016/0290457 A1 * | 10/2016 | Walter | F16H 37/022 |

FOREIGN PATENT DOCUMENTS

| | | |
|---|---|---|
| EP | 1 071 893 A1 | 1/2001 |
| JP | S58-038055 U | 3/1983 |
| JP | 60-37455 A | 2/1985 |
| JP | 06-245329 A | 9/1994 |
| JP | 2007-292140 A | 11/2007 |
| JP | 2008-051213 A | 3/2008 |
| JP | 2010-053883 A | 3/2010 |
| JP | 2010-261544 A | 11/2010 |
| JP | 2011-122671 A | 6/2011 |
| KR | 10-2004-0020116 A | 3/2004 |

OTHER PUBLICATIONS

U.S. Office Action issued in co-pending U.S. Appl. No. 14/917,126 dated Dec. 15, 2017.
US Notice of Allowance issued in corresponding U.S. Appl. No. 14/917,126 dated Apr. 26, 2018.

* cited by examiner

AUTOMATIC TRANSMISSION FOR ELECTRIC VEHICLE

TECHNICAL FIELD

This invention relates to an automatic transmission for an electric vehicle which is used in an electric vehicle arranged to run only by an electric motor serving as a driving source, and which includes a belt type continuously variable transmission mechanism.

BACKGROUND ART

In a case of an electric vehicle (referred to also as EV) which runs only by an electric motor serving as a driving source, the electric motor has a flat torque characteristics. Accordingly, in general, a power train has a configuration arranged to output by a combination between the electric motor of the driving source, and a speed reduction device having a constant transmission gear ratio.

In the thus-constructed electric vehicle, there is a large problem to ensure a cruising range (driving range). First, an increase of a battery capacity and a weight reduction of the vehicle are conceivable as a method for increasing the cruising range. However, in a case where the battery capacity is increased, the weight of the vehicle is increased. Therefore, the cruising range may be decreased.

Moreover, the decrease of the consumed power by decreasing the size of the electric motor of the driving source is conceivable as the method for increasing the cruising range in the electric vehicle. However, in this case, it cause the deficiency of the output of the electric motor. For preventing the deficiency of the output, it is necessary to combine with a speed reduction device having a higher transmission gear ratio, or to combine with a transmission having variable transmission gear ratio. In a case of the former, the vehicle runs at a characteristic value at which the motor efficiency is wrong in the vehicle high speed region. In a case of the latter, it is possible to avoid this by varying the transmission gear ratio.

A patent document 1 discloses a configuration in which the electric motor outputs by a combination with a stepped transmission, as an example in which the transmission is applied to the electric vehicle. However, in this case, the gear stage is needed to be the multi stages for efficiently driving the small electric motor in the wide speed region. Accordingly, the switching of the gear stages becomes frequent. The number of the shift shock generated at the each switching of the gear stage is increased. The riding feeling is deteriorated.

On the other hand, a continuously variable transmission (CVT) with an auxiliary transmission mechanism in which the auxiliary transmission mechanism is combined in a belt type continuously variable transmission (variator) is effective as a mechanism which can efficiently drive the small electric motor in the wide speed range, and which can suppress the frequency of the shift shock. Besides, a patent document 2 discloses a configuration which is not an electric vehicle, and which is arranged to output by a combination of an internal combustion engine and the CVT with the auxiliary transmission mechanism.

It is conceivable that the CVT with the auxiliary transmission mechanism of the patent document 2 is applied to the electric vehicle. However, the variator of the CVT needs applying the large axial thrust for clamping to sandwich the belt between the pulleys. The auxiliary transmission mechanism needs the switching operation of the gear stages. The patent document 2 does not describes these concrete methods. If the generally used hydraulic methods are used, the oil pump of the high output for satisfying these is needed.

For driving the oil pump of the high output, the motor for driving the pump which has a suitable output is needed. An SOC (a state of charge) of the battery is decreased by the power consumed by this motor for driving the pump. Accordingly, a cruising range of the electric vehicle is decreased. Moreover, the oil pump and the motor for driving the pump causes the cost-up and the increase of the weight of the vehicle. Accordingly, these decrease the cruising range of the electric vehicle.

Moreover, in the case of the CVT, in general, the power transmitting efficiency at the high speed and the high load is not good, and the electric power consumption at the high speed running is not good, relative to an automatic transmission using a gear mechanism using a planetary gear and so on.

This deterioration of the electric power consumption causes the decrease of the cruising range of the electric vehicle. In consideration of these points, the development of the art is desired.

PRIOR ART DOCUMENT

Patent Document

Patent Document 1: Japanese Patent Application Publication No. H06-245329

Patent Document 2: Japanese Patent Application Publication No. S60-37455

SUMMARY OF THE INVENTION

It is, therefore, an object of the present invention to provide an automatic transmission for an electric vehicle which is devised to solve the above-described problems, to efficiently drive a small electric motor in a wide speed range, to suppress a frequency of shift shock, and thereby to increase a cruising range of the electric vehicle.

For attaining the above-described objects, an automatic transmission for a vehicle according to the present invention, An automatic transmission for an electric vehicle, the automatic transmission which is provided to the electric vehicle arranged to run only by a main electric motor as a driving source, the automatic transmission comprises: a belt type continuously variable transmission mechanism which has an input portion that is disposed to be rotated relative to an input shaft connected to the main electric motor, and in which a winding radius of a pulley and a clamping force are adjusted by an electric actuator and a mechanical reaction force mechanism; a constantly meshed parallel shaft type gear transmission mechanism which is connected to an output portion of the belt type continuously variable transmission mechanism, and which has a plurality of shift stages; an input gear which is disposed to the input shaft to be rotated relative to the input shaft, and which is drivingly connected to one of a plurality of shift gears fixed to an output side shaft of the constantly meshed parallel shaft type gear transmission mechanism; and an engaging clutch mechanism which is disposed to the input shaft, and which selectively connects one of the input portion of the belt type continuously variable transmission mechanism and the input gear to the main electric motor.

It is preferable that a torque cam mechanism is used in the mechanical reaction force mechanism; the electric actuator includes a worm gear including a worm and a worm wheel, and an electric motor arranged to rotationally drive the worm; the torque cam mechanism is arranged to adjust the clamping force of the pulley; and the electric actuator is arranged to adjust the winding radius of the pulley.

It is preferable that the input gear has a teeth number substantially identical to a teeth number of a gear of the constantly engaging parallel shaft transmission mechanism which is engaged with the input gear.

By the automatic transmission for the electric vehicle according to the present invention, the belt type continuously variable transmission and the constantly meshed parallel shaft type gear transmission mechanism are always combined. With this, it is possible to obtain the automatic transmission having a wide gear ratio range. Accordingly, it is possible to decrease the load of the electric motor of the driving source. Consequently, it is possible to decrease the entire size of the power train by the decrease of the size of the electric motor, and to use the region in which the motor efficiency is good. Therefore, it is possible to improve the power train efficiency, and to increase the cruising range. Moreover, it is possible to suppress the frequency of the shift shocks by the smooth shift characteristics of the belt type continuously variable transmission, and to ensure the riding feeling.

Furthermore, it is possible to run by the direct connection between the electric motor's side and the driving wheel's side by using the input gear without using the belt type continuously variable transmission. Accordingly, it is possible to prevent the decrease of the efficiency at the high speed running which is no good for belt-type continuously variable transmission, by using the input gear without using the belt type continuously variable transmission.

Moreover, the belt clamping of the belt type continuously variable transmission is a mechanical mechanism. Moreover, the constantly meshed parallel shaft type gear transmission mechanism is used. Accordingly, the hydraulic system such as the conventional belt type continuously variable transmission and the planetary gear type transmission mechanism is not needed. Consequently, it is possible to increase the cruising range by the energy of the power source which is needed for the operation of the hydraulic system.

BRIEF DESCRIPTION OF DRAWINGS

FIG. 3(a) shows a CVT low mode. FIG. 3(b) shows a CVT high mode. FIG. 3(c) shows a direct connection mode.

DESCRIPTION OF EMBODIMENTS

Hereinafter, one embodiment of an automatic transmission for an electric vehicle according to the present invention is illustrated with reference to the drawings. Besides, the below-described embodiment are merely example. It is not intended to exclude various variations and applications of the art which are not described in the below-described embodiment. It is possible to implement by using a part of the embodiment, to implement by varying a part of the embodiment, and to implement by displacing other mechanisms and other devices having identical functions.

The electric vehicle according to the present invention (hereinafter, referred to merely as a vehicle) is an electric vehicle (called also as EV) which runs to use only an electric motor as a driving source. The electric vehicle according to the present invention does not include a hybrid vehicle which runs by selectively using the electric motor and an internal combustion engine as a driving source. Moreover, the present automatic transmission is disposed between the electric motor and driving wheels of the thus-constructed vehicle.

[Configuration of Driving System Unit]

Figure 1:
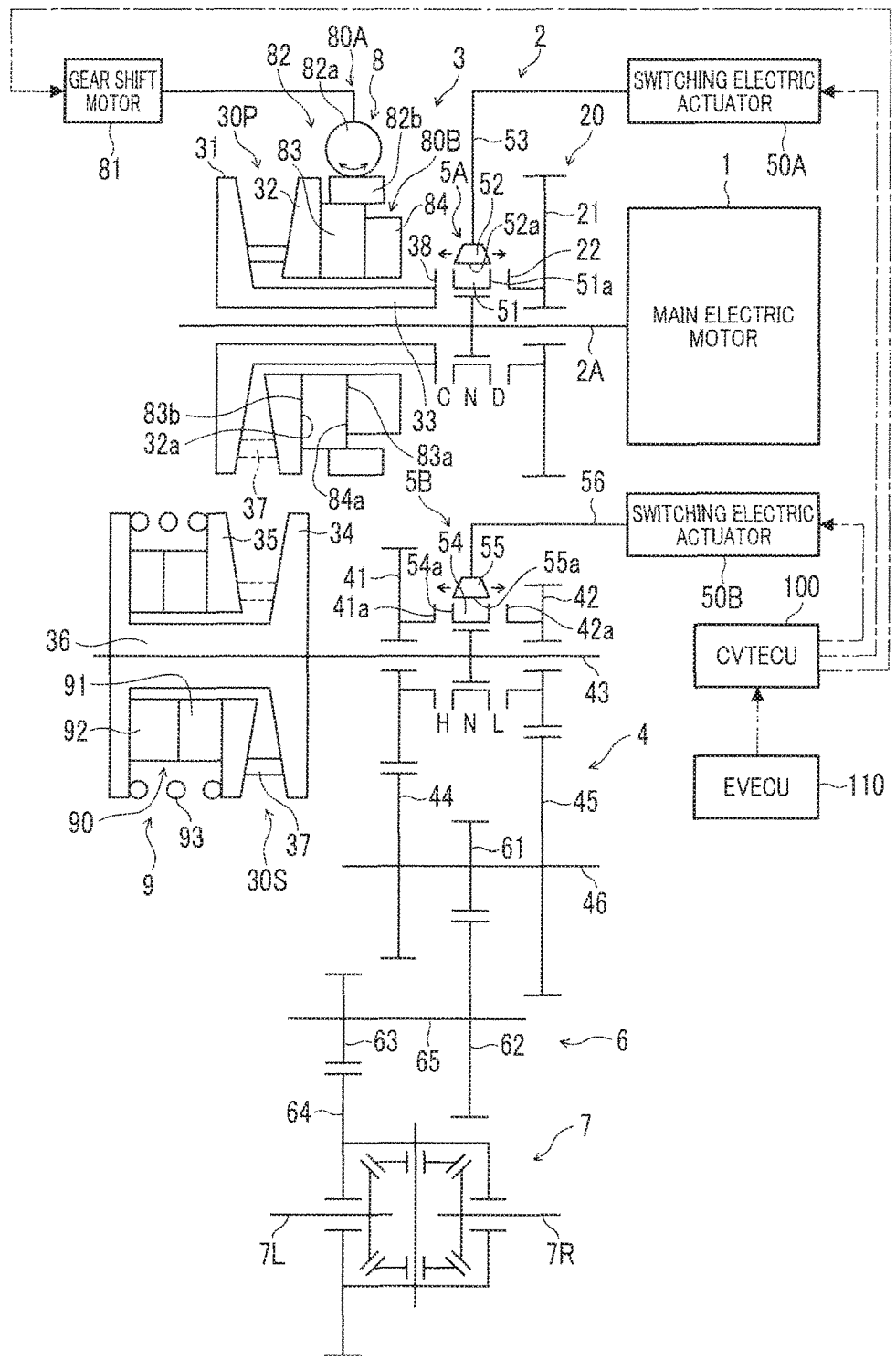
FIG. 1 is a configuration view showing a main part of a driving system unit of a vehicle which is provided with an automatic transmission according to one embodiment.
Figure 2:
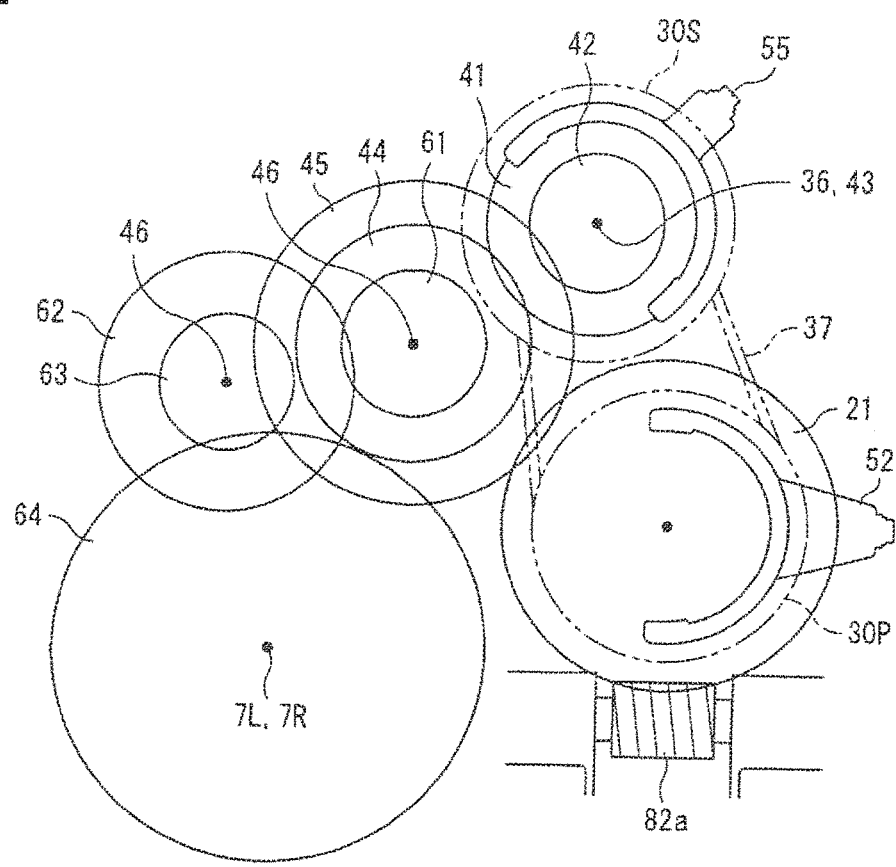
FIG. 2 is an axial disposition view showing the main part of the driving system unit of the vehicle which is provided with automatic transmission according to the one embodiment.

First, a driving system unit of the vehicle is illustrated. As shown in FIG. 1 and FIG. 2, this driving system unit includes a main electric motor (called merely also as an electric motor) 1 which is a driving source of the vehicle; an automatic transmission 2 including a transmission input shaft (hereinafter, referred to as an input shaft) 2A which is integrally connected to an output shaft of the main electric motor 1; a speed reduction mechanism 6 connected to the automatic transmission 2; and a differential mechanism 7 connected to the speed reduction mechanism 6. Wheel shafts 7L and 7R are connected to left and right side gears of the differential mechanism 7. Driving wheels (not shown) are connected, respectively, to the wheel shafts 7L and 7R.

The automatic transmission 2 is a transmission which is constituted by adding a direct connection gear mechanism 20 to a belt type continuously variable transmission mechanism (CVT) with an auxiliary transmission mechanism. The automatic transmission 2 includes a belt 37 for transmitting a power. Moreover, the automatic transmission 2 includes a belt type continuously variable transmission mechanism (hereinafter, referred to also as a variator) 3 which includes a primary pulley (input portion) 30P that is disposed to be rotated relative to the input shaft 2A; a constantly meshed parallel shaft type gear transmission mechanism (hereinafter, referred to also as the auxiliary transmission mechanism) 4 which is connected to a rotation shaft 36 of a secondary pulley (output portion) 30S of this variator 3; and the direct connection gear mechanism 20 which is arranged to directly connect the input shaft 2A and the speed reduction mechanism 6 to avoid the variator 3 and the auxiliary transmission mechanism 4.

The variator 3 includes the primary pulley 30P including a fixed pulley 31 including a rotation shaft 33, and the movable pulley 32; a secondary pulley 30S including a fixed pulley 34 including the rotation shaft (output shaft) 36, and a movable pulley 35; and a belt 37 which is wound around V grooves of the primary pulley 30P and the secondary pulley 30S. The rotation shaft 33 of the fixed pulley 31 of the primary pulley 30P is disposed to be rotated relative to the input shaft 2A.

Besides, FIG. 1 shows the primary pulley (the pulley device) 30P, the secondary pulley (the pulley device) 30S, and the belt 37 of the variator 3 in a state where a transmission gear ratio is a low side and a high side. The state of the low side is shown in half portions of respective outer sides (on a side on which the pulleys are apart from each other) of the primary pulley 30P and the secondary pulley 30S. The high side state is shown in half portions of respective inner sides (on a side on which the pulleys are near each other) of the primary pulley 30P and the secondary pulley 30S. The state of the low side of the belt 37 is schematically shown by a solid line. The state of the high side of the belt 37 is shown schematically shown by a two dot chain line. Besides, the high state shown by the two dot chain line shows only a position relationship of the radial direction of the pulley and the belt. An actual belt position does not appears in the half portion of the inner side of the pulley.

An electric actuator and a mechanical reaction force mechanism perform an adjustment of the transmission gear ratio, and an adjustment of a pulley thrust (referred to merely as a thrust), that is, an adjustment of a belt clamping force, by varying belt winding radii of the primary pulley 30P and the secondary pulley 30S of this variator 3. A torque cam mechanism is used as the mechanical reaction force mechanism. This torque cam mechanism is constituted by a pair of cam members which have annular shapes, and which have cam surfaces that are positioned at end portions, and that are inclined in spiral (helical) shapes. These torque cam mechanisms are disposed so that the respective cam surfaces are slidably abutted on each other in a coaxial manner. The pair of the cam members are arranged to be moved closer to or away from each other in the axial direction in accordance with the relative rotation of the pair of the cam members, so that an entire length of the pair of the cam members is varied. With this, the torque cam mechanism is arranged to adjust the thrust of the rotation member (pulleys 30P and 30S) which are pressed abutted on one of the cam members.

In this case, the torque cam mechanisms are used as the mechanical reaction force mechanism in both of the primary pulley 30P and the secondary pulley 30S. With this, the torque cam mechanisms of the both pulleys are acted as the reaction forces of the forces which are generated by the belt 37 to push the primary pulley 30P and the secondary pulley 30S (the force that separates the pulleys). With this, the thrust according to the transmitting torques of the belt 37 are generated in the both pulleys 30P and 30S without using hydraulic pressure and so on.

Moreover, the primary pulley 30P is provided with an electric actuator which actively drives to rotate one of the pair of the cam members. The primary pulley 30P is constituted so as to adjust the groove width of the V groove of the primary pulley 30P by varying the entire length of the pair of the cam members.

In this way, the primary pulley 30P is arranged to vary the entire length of the pair of the cam members by the torque cam mechanism which is the mechanical reaction force mechanism, and the electric actuator arranged to drive to rotate one of the pair of the cam members. With this, the primary pulley 30P is arranged to adjust the groove width of the V groove of the primary pulley 30P, and thereby to adjust the transmission gear ratio. Moreover, the primary pulley 30P is arranged to adjust the belt clamping force by adjusting the thrust of the pulley 30P. Accordingly, the mechanism constituted by the electric actuator and the torque cam mechanism of the primary pulley 30P is also referred to as a shift mechanism 8. On the other hand, the torque cam mechanism of the secondary pulley 30S is also referred to as a thrust generating mechanism 9 since the torque cam mechanism of the secondary pulley 30S generates the thrust of the secondary pulley 30s.

A torque cam mechanism 90 which is an end cam is used in this thrust generating mechanism 9. This torque cam mechanism 90 includes a driving cam 91 disposed and fixed on a back surface of the movable pulley 35; and a driven cam member 92 which is adjacent to the driving cam member 91, and which is disposed and fixed on the rotation shaft 36 of the fixed pulley 34. Cam surfaces of the cam members 91 and 92 are slidably abutted on each other. Cam members 91 and 92 generate the thrust in accordance with a rotational phase difference between the cam members 91 and 92 which is generated at the torque transmission.

Besides, the driving torque and the braking torque is not acted at the stop of the vehicle and so on. Accordingly, there is provided a coil spring 93 arranged to urge the movable pulley 35 to be moved closer to the fixed pulley 34 so as to surely clamp the belt 37 to prevent the belt slippage even at the initial driving state such as the start of the vehicle.

The auxiliary transmission mechanism 4 has a plurality of gear stages (shift stages) (in this case, two stages of the High and the Low). The auxiliary transmission mechanism 4 includes gears 41 and 42 which are provided to be rotated relative to a rotation shaft 43 which is integral coaxially with the rotation shaft 36 of the secondary pulley 30S of the variator 3; and gears 44 and 45 which are disposed and fixed on a rotation shaft 46 parallel to the rotation shaft 43 so as to rotate as a unit with the rotation shaft 46. The gear 41 and the gear 44 are constantly engaged with each other. The gear 41 and the gear 44 constitute a second speed (High) gear stage. The gear 42 and the gear 45 are constantly engaged with to each other. The gear 42 and the gear 45 constitute a first speed (Low) gear stage.

The auxiliary transmission mechanism 4 is provided with an engagement clutch mechanism 5B of three position type which is arranged to selectively switch the is second speed gear stage and the first speed gear stage. The engagement clutch mechanism 5B includes a clutch hub 54 arranged to rotate as a unit with the rotation shaft 43; a sleeve 55 having an internal teeth 55a which is spline-engaged with an external teeth 54a provided to the clutch hub 54; a shift folk 56 arranged to move the sleeve 55 in a shift direction (an axial direction); and a switching electric actuator 50B which is arranged to drive the shift folk 56.

The gear 41 is provided with an external teeth 41a arranged to be engaged with the internal teeth 55a of the sleeve 55. The gear 42 is provided with an external teeth 42a arranged to be engaged with the internal teeth 55a of the sleeve 55.

The sleeve 55 has respective positions of a neutral position (N), a second speed position (H) setting the second speed (High) gear stage, and a first speed position (L) setting the first speed (Low) gear stage. The sleeve 55 is driven to be slid among the respective positions by the shift folk 56.

By moving the sleeve 55 toward the gear 41's side (that is, the second speed position) by driving the shift folk 56 by the switching electric actuator 50B, the internal teeth 55a of the sleeve 55 is engaged with the external teeth 41a of the gear 41. With this, the rotation shaft 43 and the gear 41 rotate as a unit with each other, so that the second speed gear stage is set. When the second speed gear stage is set, the power is transmitted from the rotation shaft 36 of the secondary pulley 30S of the variator 3 (that is, the rotation shaft 43) through the gear 41, the gear 44, and the rotation shaft 46 to the speed reduction mechanism 6.

By moving the sleeve 55 toward the gear 42's side (that is, the first speed position) by driving the shift folk 56 by the switching electric actuator 50B, the internal teeth 55a of the sleeve 55 is engaged with the external teeth 42a of the gear 42. With this, the rotation shaft 43 and the gear 42 rotate as a unit with each other, so that the first speed gear stage is set. When the first speed gear stage is set, the power is transmitted from the rotation shaft 36 of the secondary pulley 30S of the variator 3 (that is, the rotation shaft 43) through the gear 42, the gear 45, and the rotation shaft 46 to the speed reduction mechanism 6.

Besides, it is possible to perform a rotation synchronous control by using the main electric motor 1 for smoothly engaging the internal teeth 55a of the sleeve 55 with the external teeth 41a of the gear 41 and the external teeth 42a of the gear 42. With this, a synchronous mechanism is not needed at an engaging portion.

The direct connection gear mechanism 20 includes an input gear (an input gear) 21 disposed to be rotated relative to the input shaft 2A. As shown in FIG. 2, this input gear 21 is engaged and drivingly connected with one of the plurality of the shift gears of the auxiliary transmission mechanism 4 (in this case, the gear 45 which is the output side gear of the first speed stage).

Besides, teeth numbers of the input gear 21 and the gear 45 are set identical to each other, or substantially identical to each other so that the transmission gear ratio becomes 1.0 or substantially 1.0.

For selectively using this direct connection gear mechanism 20 and the variator 3, there is provided an engaging (meshing) clutch mechanism 5A of 3 position type. As shown in FIG. 1, the engaging clutch mechanism 5A has a configuration identical to the engaging clutch mechanism 5B. The engaging clutch mechanism 5A includes a clutch hub 51 arranged to rotate as a unit with the input shaft 2A; a sleeve 52 including an internal teeth 52a which is spline-engaged with an external teeth 51a provided to the clutch hub 51; a shift folk 53 arranged to move the sleeve 52 in a shift direction (an axial direction); and a switching electric actuator 50A arranged to drive the shift folk 53.

The input gear 21 is provided with an external teeth 22 arranged to be engaged with the internal teeth 52a of the sleeve 52. The rotation shaft 33 of the fixed pulley 31 of the primary pulley 30P of the variator 3 is provided with an external teeth 38 which is arranged to be engaged with the internal teeth 52a of the sleeve 52.

The sleeve 52 has respective positions of a neutral position (N), a CVT position (C) setting a power transmitting path passing through the variator 3, and a direct connection position (D) setting the power transmitting path passing through the direct connection gear mechanism 20. The sleeve 52 is driven to be slid among the respective positions by the shift folk 53.

By moving the sleeve 52 toward the rotation shaft 33's side by driving the shift folk 53 by the switching electric actuator 50A, the internal teeth 52a of the sleeve 52 is engaged with the external teeth 38 of the rotation shaft 33. With this, the input shaft 2A and the fixed pulley 31 of the primary pulley 30P rotate as a unit with each other, so that the power transmitting path passing through the variator 3 is set.

By moving the sleeve 52 toward the input gear 21's side by driving the shift folk 53 by the switching electric actuator 50A, the internal teeth 52a of the sleeve 52 is engaged with the external teeth 22 of the input gear 21. The input shaft 2A and the input gear 21 rotate as a unit with each other, so that the power transmitting path passing through the direct connection gear mechanism 20 is set.

In this case, it is also possible to perform a rotation synchronous control by using the main electric motor 1 for smoothly engaging the internal teeth 52a of the sleeve 52 with the external teeth 38 of the rotation shaft 33 and the external teeth 22 of the input gear 21 by using the main electric motor 1. With this, the synchronous mechanism is not needed at an engaging portion.

Besides, in this embodiment, the both engaging clutch mechanisms 5A and 5B are not provided with the synchronous mechanism since the synchronous rotation control is performed as described above. However, in a case where there is provided the synchronous mechanism, it is possible to obtain an effect to further promote the synchronism. Moreover, in a case where the rotation synchronism control is not performed, the synchronous mechanism is needed.

The speed reduction mechanism 6 includes a gear 61 disposed and fixed on the rotation shaft 46 of the auxiliary transmission mechanism 4 to rotate as a unit with the rotation shaft 46 of the auxiliary transmission mechanism 4; a gear 62 which is disposed and fixed on a rotation shaft 65 that is parallel to the rotation shaft 46 to rotate as a unit with the rotation shaft 65, and which is engaged with the gear 61; a gear 63 disposed and fixed on the rotation shaft 65 to rotate as a unit with the rotation shaft 65; and a gear 64 which is an input gear of the differential mechanism 7, and which is engaged with the gear 63. The speed is reduced between the gear 61 and the gear 62 in accordance with that gear ratio. Moreover, the speed is reduced between the gear 63 and the gear 64 in accordance with that gear ratio.

[Shift Mechanism]

As shown in FIG. 1, the shift mechanism 8 provided to the primary pulley 30P includes the electric actuator 80A and the mechanical reaction force mechanism 80B. In this embodiment, the mechanical reaction force mechanism 80B employs the torque cam mechanism.

The torque cam mechanism employed in the mechanical reaction force mechanism 80B is disposed behind the movable pulley 32 of the primary pulley 30P. The torque cam mechanism includes a pair of cam members 83 and 84 coaxially disposed on the rotation shaft 33. The cam members 83 and 84 include, respectively, spiral cam surfaces 83a and 84a which are inclined with respect to a direction perpendicular to the rotation shaft 33. The pair of the cam members 83 and 84 are disposed so that the respective cam surfaces 83a and 84a are abutted on each other.

The cam member 83 and the cam member 84 can be rotated relative to the rotation shaft 33. The cam member 83 and the cam member 84 are disposed coaxially with the rotation shaft 33 independently of the fixed pulley 31 and the movable pulley 32 of the primary pulley 30P. That is, the cam members 83 and 84 are not rotated even when the primary pulley 30P is rotated. Besides, the cam member 84 is a fixed cam member which is fixed in the rotation direction and in the axial direction. The cam member 83 is a movable cam member which is arranged to be rotated relative to the cam member 84, and to be moved in the axial direction. Moreover, the movable cam member 83 includes a sliding surface 83b which is positioned on a side opposite to the cam surface 83a, and which is slidably abutted on a back surface 32a of the movable pulley 32 through a thrust bearing and so on.

The electric actuator 80A rotationally drives the movable cam member 83 so that the cam surface 83a of the movable cam member 83 is rotated relative to the cam surface 84a of the fixed cam member 84. With this, the electric actuator 80A moves the movable cam member 83 in the axial direction of the rotation shaft 33 along the inclinations of the cam surface 83a and the cam surface 84a. With this, the electric actuator 80A moves the movable pulley 32 in the axial direction of the rotation shaft 33, so as to adjust the groove width of the V groove of the primary pulley 30P.

Moreover, the electric actuator 80A includes a worm gear mechanism 82 including a worm (screw gear, crossed helical gear) 82a, and a worm wheel (helical gear) 82b engaged with this worm 82a; and an electric motor (gear shift motor) 81 arranged to rotatably drive the worm 82a. The worm wheel 82b is disposed coaxially with the rotation shaft 33. The worm wheel 82b is connected by serration so as to rotate as a unit with the movable cam member 83, and to allow the movement of the movable cam member 83 in the axial direction. With this, when the electric motor 81 is actuated to rotationally drive the worm 82a, the worm wheel 82b is rotated to pivot the movable cam member 83, so that the groove width of the V groove of the primary pulley 30P is adjusted.

The adjustment of the groove width of the V groove of the primary pulley 30P by the shift mechanism 8 is performed while receiving the thrust of the secondary pulley 30S which is generated by the thrust generating mechanism 9. When the groove width of the V groove of the primary pulley 30P is decreased, the groove width of the V groove of the secondary pulley 30S which is connected through the belt is increased. Accordingly, it resists the thrust by the thrust generating mechanism 9. When the groove width of the V groove of the primary pulley 30P is increased, the groove width of the V groove of the secondary pulley 30S is decreased. Accordingly, the thrust by the thrust generating mechanism 9 is used.

For example, when the groove width of the V groove of the primary pulley 30P is decreased, the electric motor 81 is actuated so as to separate the movable cam member 83 from the fixed cam member 84. In accordance with this actuation, the winding radius of the belt 37 with respect to the primary pulley 30P is increased. Consequently, the tension of the belt 37 is increased. The increase of the tension of the belt 37 is acted to decrease the winding radius of the belt 37 with respect to the secondary pulley 30S. The increase of the groove width of the V groove of the secondary pulley 30S is needed for the decrease of the winding radius of the belt 37 with respect to the secondary pulley 30S. In the thrust generating mechanism 9 of the secondary pulley 30S, the effect (resistance force) to resist this increase of the groove width is generated as the thrust. Accordingly, the electric actuator 80A drives the movable cam member 83 to resist this thrust.

Moreover, when the groove width of the V groove of the primary pulley 30P is increased, the electric motor 81 is actuated so that the movable cam member 83 is moved closer to the fixed cam member 84. At this time, the winding radius of the belt 37 with respect to the primary pulley 30P is decreased, so that the tension of the belt 37 is decreased. The decrease of the tension of the belt 37 causes the slippage between the secondary pulley 30S and the belt 37. The movable pulley 35 of the secondary pulley 30S follows to the belt 37. However, the slippage of the fixed pulley 34 with respect to the belt 37 is generated. In accordance with this slippage, a torsion is generated between the fixed pulley 34 and the movable pulley 35. The thrust of the secondary pulley 30S is increased (strengthened) in accordance with this torsion between the fixed pulley 34 and the movable pulley 35.

[Control Device]

As shown in FIG. 1, this vehicle includes an EVECU 110 configured to totally control the electric vehicle; and a CVTECU 100 configured to control main parts of the automatic transmission (CVT with the auxiliary transmission mechanism) 2. Each of the ECUs is a computer constituted by memories (ROM and RAM), CPU and so on. The CVTECU 100 is configured to control the actuations of the electric motor 81 constituting the electric actuator 80A of the shift mechanism 8, and the switching electric actuators 50A and 50B, and so on, based on command or information from the EVECU 110, and information from other sensors and so on.

[Operations and Effects]

The present embodiment is constituted as described above. Accordingly, it is possible to obtain following operations and effects.

Figure 3:
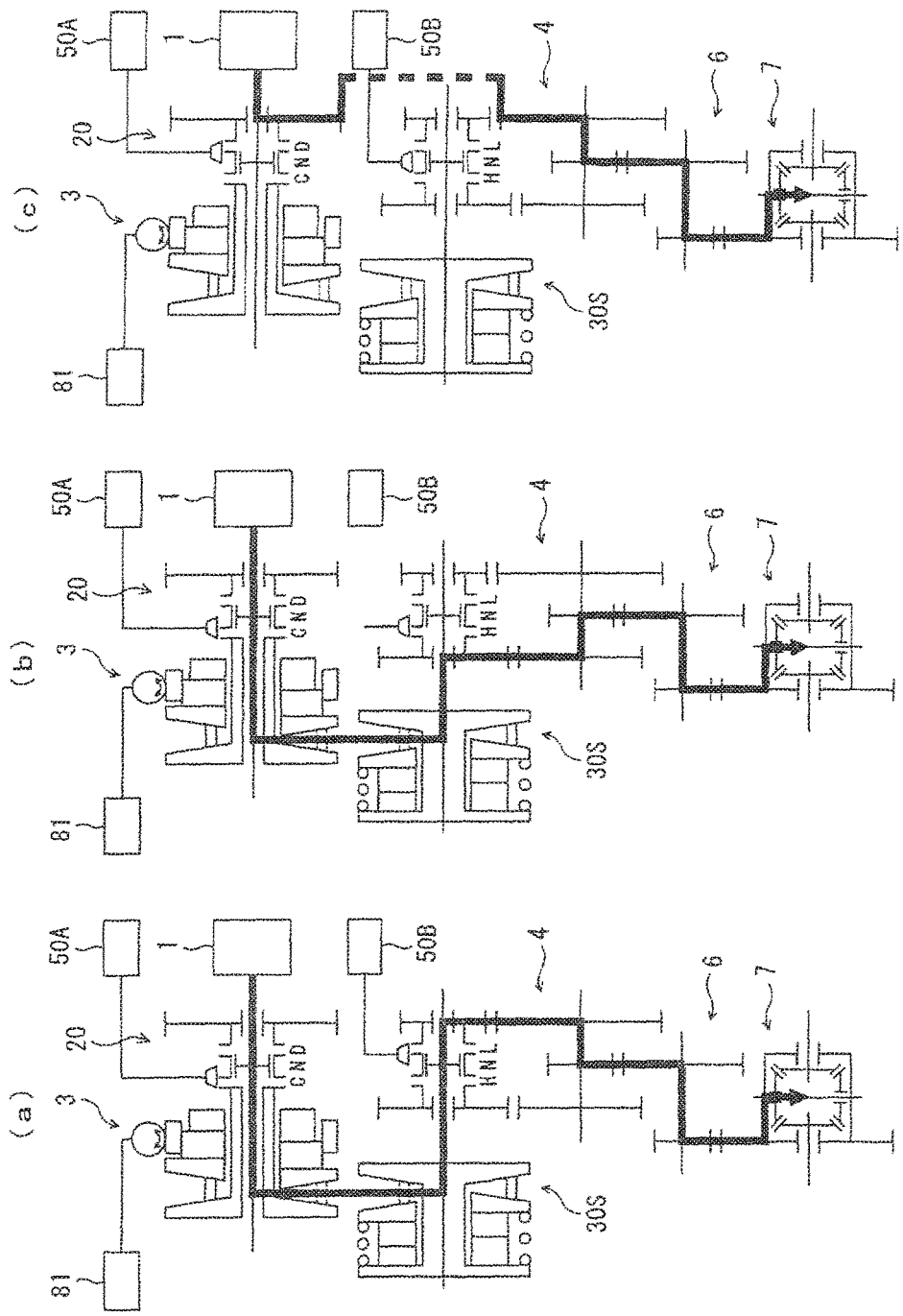
FIG. 3 are views for illustrating a power transmitting mode of the driving system unit of the vehicle which is provided with the automatic transmission according to the one embodiment.

The automatic transmission 2 is constituted by the variator (the belt type continuously variable transmission mechanism) 3, the auxiliary transmission mechanism (the constantly meshed parallel shaft type gear transmission mechanism) 4, and the direct connection gear mechanism 20. Accordingly, the CVTECU 100 can select and use three main power transmitting modes shown in FIG. 3 by using, for example, a shift map shown in FIG. 4.

At the normal start of the vehicle, the CVT low mode in which the variator 3 is used and the auxiliary transmission mechanism is switched to the first speed (the Low) is selected, as shown in FIG. 3(a). When the vehicle speed is increased after the start, the CVT high mode in which the variator 3 is used and the auxiliary transmission mechanism 4 is switched to the second speed (the High) is selected, as shown in FIG. 3(b). In general, it is possible to handle the many running situations by this CVT high mode.

Figure 4:
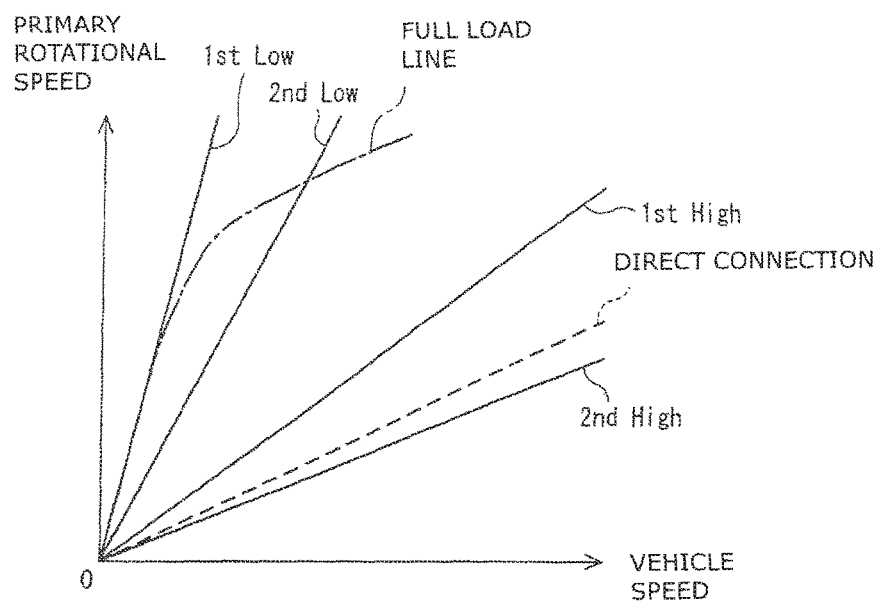
FIG. 4 is a view showing one example of shift map of the automatic transmission according to the embodiment.

In this way, by using the auxiliary transmission mechanism 4, it is possible to run in a wide range of the transmission gear ratio from a state (1st Low) in which the variator 3 is brought to the lowest in the CVT low mode where the auxiliary transmission mechanism 4 is brought to the first speed (the Low), to a state (2nd High) in which the variator 3 is brought to the highest in the CVT high mode where the auxiliary transmission mechanism 4 is brought to the second speed (the High), as shown in FIG. 4. By increasing the width of the transmission gear ratio of the automatic transmission 2, it is possible to decrease the load of the electric motor 1 of the driving source. Accordingly, it is possible to decrease the size of the electric motor 1, and thereby to decrease the entire size of the power train. Moreover, it is possible to use the region in which the good efficiency of the electric motor 1 is obtained, and thereby to improve the efficiency of the power train. With this, it is possible to increase the cruising range (driving range) of the electric vehicle.

Moreover, when the vehicle runs on the highway at the high speed, the direct connection mechanism 20 is used as shown in FIG. 3(b). With this, it is possible to attain the power transmission by the gear having the high transmitting efficiency. Accordingly, it is possible to improve the energy efficiency for the above effects, and to increase the cruising range of the electric vehicle.

Moreover, it is possible to perform the switching of the three power transmitting modes, while performing the synchronization of the rotation by using the electric motor 1. Accordingly, it is possible to omit the synchronous mechanism and so on, or to decrease the torque capacity of the synchronous mechanism.

Consequently, it is possible to decrease the cost of the device.

[Others]

Hereinabove, the embodiment of the present invention is illustrated. However, the present invention is not limited to the embodiment. The above-described embodiment can be arbitrarily varied, and the embodiment can be performed by employing a part of the embodiment as long as it is included in the gist of the present invention.

For example, in the embodiment, the three position type is employed as the engaging clutch mechanisms 5A and 5B so as to simplify the configuration of the device. Combination of two engaging clutch mechanisms of two positon type can be used in one or both of the engaging clutch mechanism 5A and 5B.

Moreover, the mechanical reaction force mechanism is not limited to the end surface cam mechanism shown in the embodiment. In case of the end cam mechanism, it is possible to constitute the mechanism having the large torque capacity to the compact size.

Furthermore, in the embodiment, the engaging clutch mechanisms 5A and 5B do not have the synchronous mechanism at the engaging portion. However, in a case where the synchronous mechanism is provided at the engaging portion, the high accuracy of the rotation synchronous control is not requested. Accordingly, it is possible to engage the clutch mechanisms 5A and 5B before the completion of the rotation synchronism, and thereby to decrease the time period necessary for the shift.

The invention claimed is:

1. An automatic transmission for an electric vehicle, the automatic transmission which is provided to the electric vehicle arranged to run only by a main electric motor as a driving source, the automatic transmission comprising:
   a belt type continuously variable transmission mechanism which has an input portion that is disposed to be selectively rotatable relative to an input shaft connected to the main electric motor, and in which a winding radius of a pulley and a clamping force are adjusted by an electric actuator and a mechanical reaction force mechanism;
   a constantly meshed parallel shaft type gear transmission mechanism which is connected to an output portion of the belt type continuously variable transmission mechanism, and which has a plurality of gear stages, and which is arranged to vary a speed of an output rotation of the belt type continuously variable transmission mechanism at each of the plurality of gear stages;
   a direct connection gear comprising an input gear which is disposed to the input shaft to be selectively rotatable relative to the input shaft, and which is drivingly connected to one of a plurality of shift gears fixed to an output side shaft of the constantly meshed parallel shaft type gear transmission mechanism; and
   an engaging clutch mechanism which is disposed to the input shaft, and which selectively connects one of the input portion of the belt type continuously variable transmission mechanism or the input gear of the direct connection gear to the input shaft connected to the main electric motor.

2. The automatic transmission for the vehicle as claimed in claim 1, wherein a torque cam mechanism is provided in the mechanical reaction force mechanism; the electric actuator includes a worm gear including a worm and a worm wheel, and an electric motor arranged to rotationally drive the worm; the torque cam mechanism is arranged to adjust the clamping force of the pulley; and the electric actuator is arranged to adjust the winding radius of the pulley.

3. The automatic transmission for the vehicle as claimed in claim 1, wherein the input gear has a teeth number substantially identical to a teeth number of a gear of the constantly engaging parallel shaft transmission mechanism which is configured to engage with the input gear.

* * * * *